April 2, 1963   W. C. MORRIS   3,083,998
PORTABLE INDEX TRAVEL FILE AND VEHICLE ARM REST
Filed April 6, 1961   2 Sheets-Sheet 1
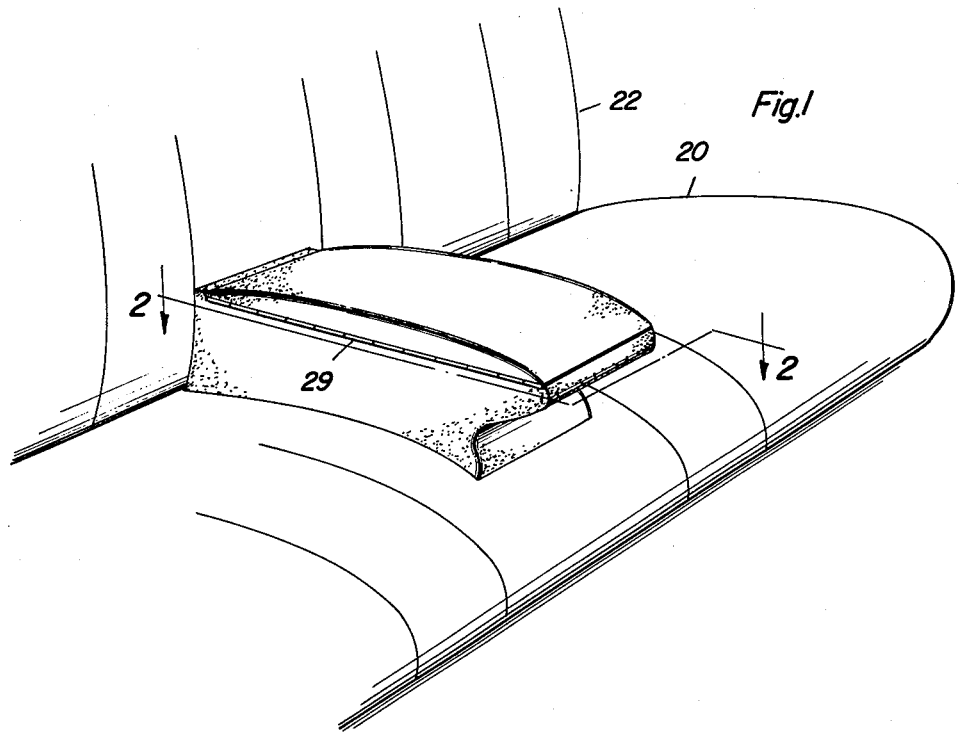
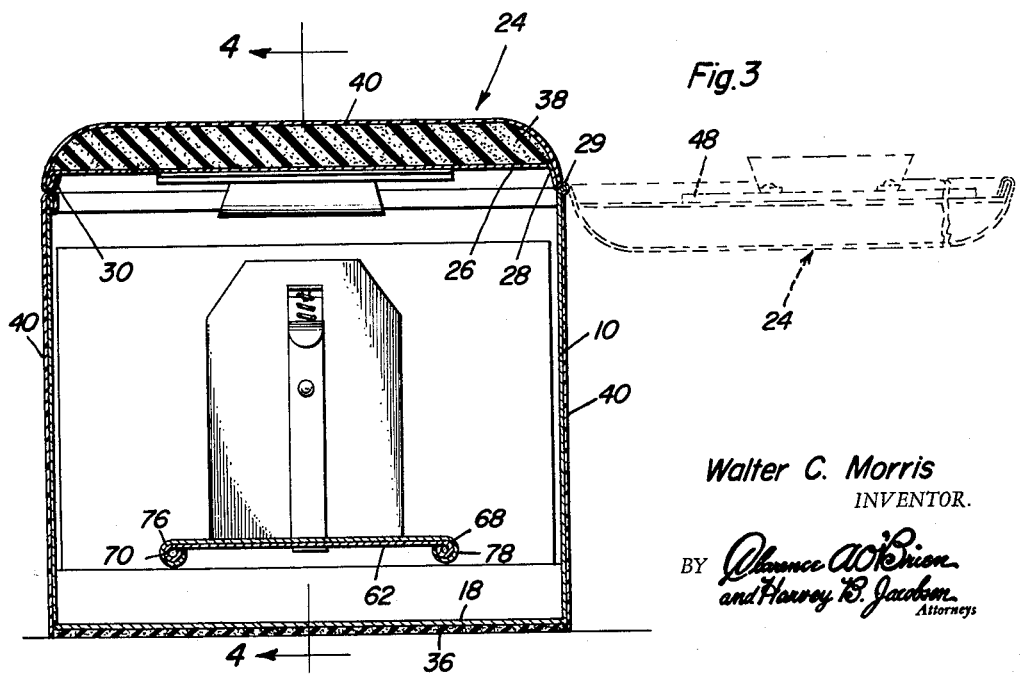
Walter C. Morris
INVENTOR.
BY *[signatures]*
Attorneys

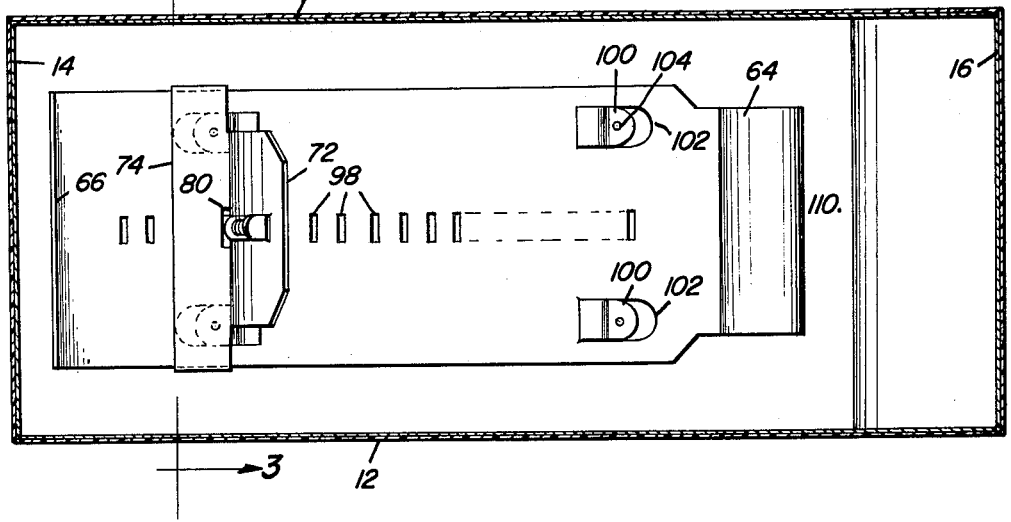
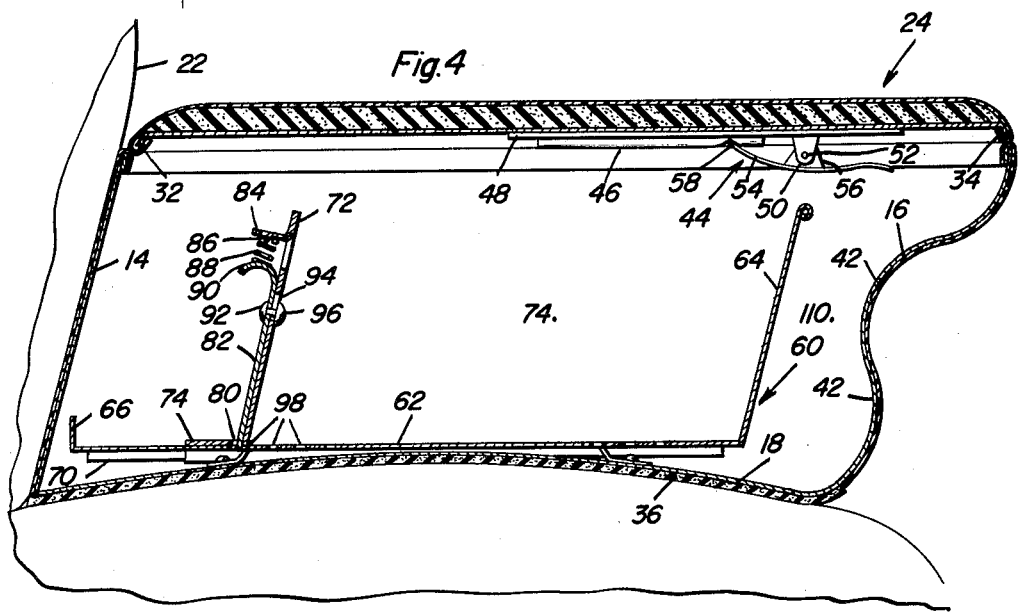

3,083,998
PORTABLE INDEX TRAVEL FILE AND VEHICLE ARM REST
Walter C. Morris, P.O. Box 553, Union City, Tenn.
Filed Apr. 6, 1961, Ser. No. 101,278
7 Claims. (Cl. 297—194)

This invention relates to accessories for seats, and more particularly to an accessory for an automobile seat and which will function as a travel file, seat divider, arm rest, and storage compartment.

Briefly, the invention comprises a generally box-like chamber having a hinged upper lid and a curved bottom surface for fitting upon and being supported by the upper surface of an automobile seat. The top of the lid normally folds downwardly in a horizontal position to close the compartment and the upper surface of the lid is covered by foam rubber and plastic so as to make a comfortable arm rest. The inside of the compartment has an adjustable file rack for storing miscellaneous papers and cards. At the end of the compartment is a separate chamber for the storage of miscellaneous articles other than papers and cards.

Accordingly, it is the primary object of this invention to provide a portable index travel file, and seat divider for automobile seats which serves as an arm rest and a storage compartment for miscellaneous papers and articles.

It is another object of the invention to provide an arm rest having a top which folds outwardly 180° to a horizontal position for supporting a note pad clip and functioning as an auxiliary desk or writing surface.

It is still another object of my invention to provide a seat divider for automobile seats which may be used as a child's seat.

It is yet another object of the invention to provide a seat divider which is simple in design, economical to manufacture and durable in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing my seat divider installed on an automobile seat;

FIGURE 2 is an enlarged horizontal sectional view taken substantially on the plane of line 2—2 in FIGURE 1;

FIGURE 3 is an enlarged vertical cross sectional view taken substantially on the plane of line 3—3 of FIGURE 2; and FIGURE 4 is a vertical cross sectional view taken substantially on the plane of line 4—4 in FIGURE 3.

Referring to the drawings, it can be seen that my travel file seat divider comprises a generally hollow box-like structure having spaced parallel vertically extending side walls 10 and 12 connected at their ends to the vertically extending rear wall 14 and front wall 16.

A floor 18 which is curved from front to rear to fit the upper surface of the lower seat 20 is connected at its ends to the front and rear walls 16 and 14. The rear wall 14 slopes upwardly and forwardly as shown in FIGURE 4 so as to conform with the contour of the back rest 22 of the seat.

The lid 24 comprises a flat rectangular member 26 hinged at one of its sides by hinge 29 which preferably extends along the entire length of the lid and is connected to the upper edge of the side wall 10. The lid plate 26 has downwardly extending flanges 28, 30, 32 and 34 formed around its periphery. The flange 28 is connected to the hinge 29.

The floor 18 has bonded to its lower surface a sheet of sponge rubber 36 and the lid plate 26 has bonded to its upper surface a relatively thick layer of foam rubber 38. All of the exposed vertically extending walls as well as the outer surface of the foam rubber 38 are covered by a layer of flexible plastic sheet material 40. The side walls 10, 12, 14 and 16 and the lid plate 26 are all formed of a rigid sheet material, preferably #18 gauge sheet steel. The plastic 40 is bonded to the side wall and overlaps the upper edge thereof. The plastic 40 covering the foam rubber 38 also overlaps the flanges of the lid plate 26 and is preferably bonded thereto by conventional means such as cement.

As shown in FIGURES 3 and 4, the upper surface of the lid 24 is rounded off by arcuate corners. As shown in FIGURE 4, the forward portion of the front wall and the upper position of the front wall 16 are curved so as to form a semi-circular hand-grip which merges with the upper portion of the lid 24 and an S-shaped portion 42 of the front wall 16.

The forward under surface of the lid plate 26 has secured thereto a note pad clip 44 retaining a note pad 46. The note pad clip comprises a base 48 having parallel spaced ears 50 projecting away therefrom. Extending between the ears 50 is a pivot rod 52 pivotally supporting an arcuate clip plate 54 by means of ears 56 fixed to the clip plate. The clamping end 58 of the clip plate is urged tightly into engagement with the note pad 46 by means of a spring, not shown, mounted between the ears 50.

A card file 60 is mounted within the arm rest and secured to the floor 18. The card file comprises a bottom 62 having an integral upwardly extending slightly forwardly inclined front wall 64 and integral rear flange 66 extending vertically upward. As shown more clearly in FIGURE 3, the side edges of the bottom 62 are rolled into circular flanges 68 and 70.

An adjustable rear wall 72 which is parallel to the front wall 64 is slidable toward and away from the front of the arm rest for varying the length of the space 74 between the front and rear walls. The rear wall 72 has bent rearwardly therefrom a bottom flange 74 which extends across the bottom 62 and has curved flanges 76 and 78 overlapping the curved flanges 70 and 68 respectively of the bottom 62 so as to slide thereon and guide the rear wall 72.

A rectangular aperture 80 is formed in the central forward edge of the bottom flange 74 adjacent its juncture to the bottom of the rear wall 72 and slidably receives a locking plunger 82 vertically slidable on the rear surface of the rear wall 72. The upper central portion of the rear wall 72 has a spring abutment 84 extending rearwardly therefrom and secured thereto. Spring abutment 84 has a tongue 86 punched downwardly therefrom which extends into the upper end of a spring 88. The upper end of the lock 82 is bent to a semi-circular shape to form a handle 90. The upper surface of the handle 90 is urged downwardly by the lower end of the coil spring 88. The guide rivet 92 is fixed to the upper central portion of the lock 82 and extends through a narrow elongated slot 94 for slidably guiding the lock 82. The head 96 of the rivet 92 extends beyond the side edges of the narrow slot 94 for guiding the lock. A plurality of spaced rectangular apertures 98 are formed at the bottom 62 of the card file.

The bottom 62 has four tabs 100 punched from the aperture 102 and bent downwardly so as to be parallel with the floor 18. The rivets 104 extend through the tabs 100 and the floor 18 for securing the bottom 62 to the floor.

In operation, the index travel file, and seat divider when in a closed position as shown in FIGURE 1 functions as an arm rest, a baby seat, and as a means for dividing the seat.

When the lid 24 is opened to the dotted line position shown in FIGURE 3, the hinge 29 automatically maintains the lid in a horizontal position as shown since the hinge has a built-in stop means. In the dotted line horizontal position shown in FIGURE 3, the lid supports the writing pad 46 on the pad clip 48, and the lid may also be used as a desk or writing surface. When the lid is open the card file is also exposed for use, and the cards may be inserted or removed from the space 74 between the front and rear wall 64 and 72 respectively. The space 74 may be adjusted in length by lifting upwardly the lock 82 by means of handle 90 and sliding it to the desired position along bottom 62 towards and away from the front wall 64. The rear wall 72 is locked in any desired position by releasing the handle 90 whereby the coil spring 88 forces the lock 82 in the appropriate aperture 98.

A brace, not shown, may be employed to support the lid 24 in the dotted line position shown in FIGURE 3. This brace could be supported on and retractable into or against the side wall 10.

The space 110 between walls 64 and 16 may be used for the storage of miscellaneous articles as maps, sun glasses, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable seat index travel file and divider comprising a generally hollow box-like structure having parallel side walls connected by a front wall, a rear wall and a floor, a lid hinged to one of the side walls and covering an opening formed between the upper edges of the side walls, said lid being rotatable on said hinge so as to expose its bottom side in an inverted position whereby it may be used as a writing surface, means securing stationery to said bottom side, an adjustable card file secured to said floor and a storage space of substantial size formed between said card file and said walls for storing miscellaneous articles.

2. In combination, a vehicle seat, a portable index travel file and seat divider supported on the center of the seat comprising a generally hollow box-like structure having parallel side walls connected by a front wall, a rear wall and a floor, a lid hinged to one of the side walls and covering an opening formed between the upper edges of the side walls, said lid being rotatable on said hinge so as to expose its bottom side in an inverted position whereby it may be used as a writing surface, means securing stationery to said bottom side, an adjustable card file secured to said floor and a storage space of substantial size formed between said card file and said walls for storing miscellaneous articles.

3. A device as defined in claim 2 wherein said lid has a plastic covering with a relatively thick layer of foam rubber between the upper surface and the plastic covering.

4. A portable index travel file and seat divider comprising a generally hollow box-like structure having parallel side walls connected by a front wall, a rear wall and a floor, a lid hinged to one of the side walls and covering an opening formed between the upper edges of the side walls, said lid being rotatable on said hinge so as to expose its bottom side in an inverted position whereby it may be used as a writing surface, means securing stationery to said bottom side, an adjustable card file secured to said floor and a storage space of substantial size formed between said card file and said walls for storing miscellaneous articles, said rear wall and floor being shaped to conform to the curvature of said seat when said seat is in operative position, said storage space being formed between said front wall and a forward end of said card file.

5. A portable index travel file and seat divider comprising a generally hollow box-like structure having parallel side walls connected by a front wall, a rear wall and a floor, a lid hinged to one of the side walls and covering an opening formed between the upper edges of the side walls, said lid being rotatable on said hinge so as to expose its bottom side in an inverted position whereby it may be used as a writing surface, means securing stationery to said bottom side, an adjustable card file secured to said floor and a storage space of substantial size formed between said card file and said walls for storing miscellaneous articles, said rear wall and floor being shaped to conform to the curvature of said seat when said seat is in operative position, said storage space being formed between said front wall and a forward end of said card file, said side walls and lid being composed of sheet steel covered with sheet plastic material.

6. A device as defined in claim 5 wherein said card file comprises a bottom fixed to said floor, an upstanding front plate fixed to said bottom, a rear plate parallel to said front plate and slidable on said bottom, and releasable means locking said rear to said bottom.

7. A device as defined in claim 6 wherein said releasable means includes a plunger slidably mounted on said rear plate, a plurality of spaced recesses formed in said bottom, spring means urging said plunger toward one of said recesses.

References Cited in the file of this patent

UNITED STATES PATENTS

| | | |
|---|---|---|
| 1,212,713 | Tinsley | Jan. 16, 1917 |
| 1,702,955 | Zaday | Feb. 19, 1929 |
| 2,006,883 | Davis et al. | July 2, 1935 |
| 2,174,939 | Howard | Oct. 3, 1939 |
| 2,678,682 | Thomas | May 18, 1954 |
| 2,701,173 | Senior et al. | Feb. 1, 1955 |

FOREIGN PATENTS

| | | |
|---|---|---|
| 1,109,549 | France | Sept. 28, 1955 |